Figure 1:
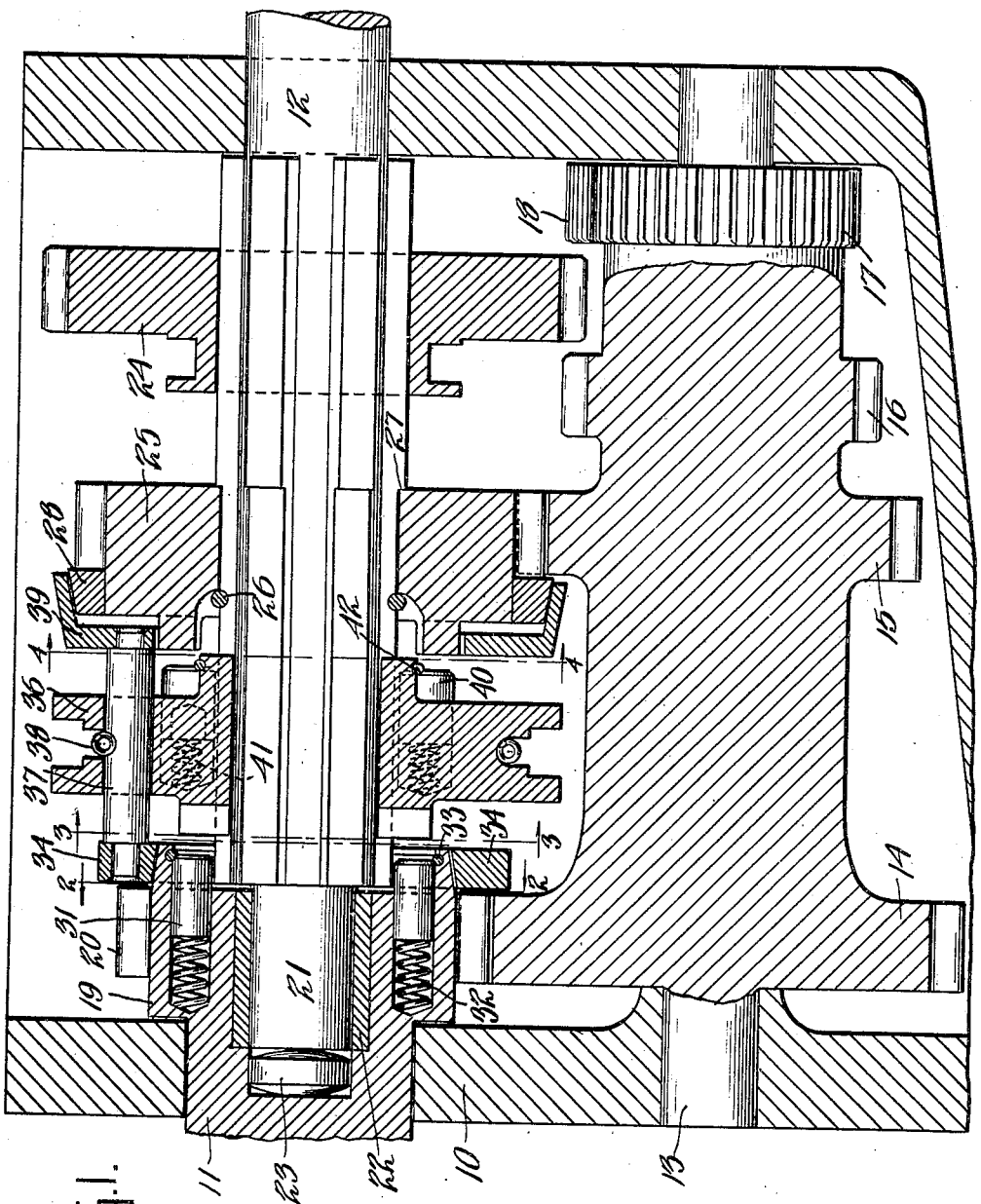

Feb. 21, 1933.  J. F. GAYLORD  1,898,949
CLUTCH MECHANISM
Filed Feb. 24, 1930   2 Sheets-Sheet 1

Inventor
John F. Gaylord
By
[signature]
Attorney

Feb. 21, 1933. J. F. GAYLORD 1,898,949
CLUTCH MECHANISM
Filed Feb. 24, 1930 2 Sheets-Sheet 2
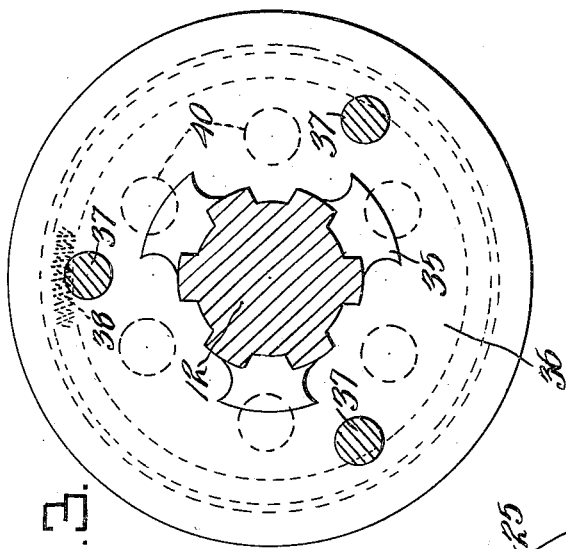
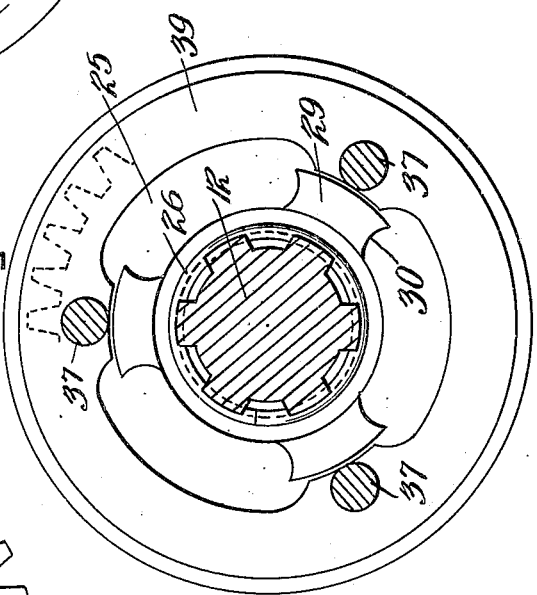
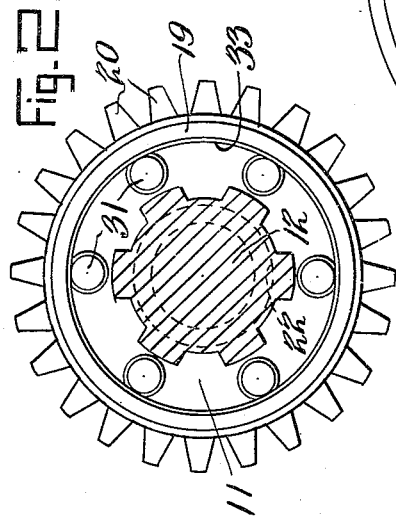
Inventor
John F. Gaylord
By
Attorney Patented Feb. 21, 1933

1,898,949

UNITED STATES PATENT OFFICE

JOHN FLETCHER GAYLORD, OF MUNCIE, INDIANA, ASSIGNOR, BY DIRECT AND MESNE ASSIGNMENTS, TO THE GAYLORD COMPANY, INC., OF HOMER, LOUISIANA, A CORPORATION OF LOUISIANA

CLUTCH MECHANISM

Application filed February 24, 1930. Serial No. 430,943.

This invention relates to clutches and especially to clutches adapted to transmission gears for motor vehicles and more particularly to clutches for synchronizing movements of the driving and driven elements.

An object of the invention is to provide clutch mechanism which is positive yet silent in shifting of gears at any speed of the car with the motor either running or not running.

Further objects and advantages will become apparent as the description proceeds.

Referring to the accompanying drawings which are made a part hereof and on which similar reference characters indicate similar parts, Figure 1 is a longitudinal sectional view of the device, Figure 2, a section on line 2—2 of Figure 1, Figure 3, a section on line 3—3 of Figure 1, and Figure 4, a section on line 4—4 of Figure 1.

In the drawings numeral 10 indicates a housing in which are mounted an engine shaft 11 or other driving shaft and a driven shaft 12 and in which is mounted a shaft 13 having made integral therewith gears 14, 15, 16 and 17. An intermediate idle gear 18 is also mounted so as to be always in mesh with the gear 17 to rotate therewith. The engine shaft 11 has an enlarged end 19 on the periphery of which are cut gear teeth 20, these teeth being in mesh with the gear 14. The driven shaft 12 has a small end 21 which is journaled in a bearing 22 in the end of the driving shaft 11. A bearing 23 is preferably seated within the shaft 11 to receive the end thrust of the shaft 12. A gear 24 is splined to the shaft 12 so as to rotate therewith but is permitted axial movement on the shaft. A gear 25 is secured upon the shaft 12 but is rotatably mounted on the shaft and is secured against axial movement on the shaft by means of a spring ring 26 which seats within an annular groove in the shaft and against the edge of the gear. The gear is held against a shoulder 27 on the shaft. A ring 28 having a cone-shaped outer surface is shrunk upon the gear 25. One face of the gear 25 is provided with lugs 29. These lugs have dished out portions 30 to form driving surface contacts with driving pins 40 to be hereinafter described.

Axially positioned in bores in the end of the shaft 11 are shown six pins 31. These pins are seated against compression springs 32 and are held in the bores against the tension of the springs by means of a spring ring 33. The outer end of the enlarged portion 19 of the shaft 11 is cone-shaped as shown to receive a cooperating cone surface on the interior of the ring 34. Three of the pins 31 form driving pins which contact with lugs 35 on one face of a ring 36. These lugs have arcuate depressions similar to the dished portions 30 in lugs 29 which depressions are engaged by the sides of the pins 31. There are three lugs 35 shown and there are six pins 31 shown. The purpose of this is to have three of the pins 31 driving and the other three taking up back lash when the car is coasting or when the driven elements are tending to run faster than the engine. The ring 36 is splined to the shaft 12 but is permitted axial movement along the shaft. This ring carries a number of pins 37 here shown as three. These pins may slide axially in bores in the ring and are frictionally held in position by means of a spring 38 which engages a notch in the side of each of the pins. The pins 37 are secured at one end in the ring 34 and at the other end to a cup 39 which has a cone shaped inner surface for engaging with the outer cone shaped surface of the ring 28. Seated in bores in one side of the ring 36 are shown six pins 40. Obviously any suitable number of these pins might be provided. These pins are held against springs 41 in the bores by means of a spring 42. The purpose of the pins 40 is to drive the ring 36 by means of the lugs 29 on the gear 25 and by means of the ring 36 drive the shaft 12. There are six pins shown and only three of the pins actually serve as driving pins, the other three serving to take up back-lash against the opposite sides of the lugs 29 when the car tends to move the normally driven elements faster than the driving elements are moving.

The operation of the device is as follows:

The gear 24 is keyed to the shaft 12. The gear 14 is always in engagement with the gear 20 so that the gears 15, 16 and 17 continuously rotate. The gear 25 is always in engagement with the gear 15 so that it continuously rotates freely on the shaft 12. When the ring is in the position shown in Figure 1 the vehicle is in neutral so that the gear 25 may freely rotate and the gear 24 is out of mesh so that rotation of the shaft 11 will not rotate the shaft 12. When the gear 24 is moved into mesh with the gear 16 by means of a gear shift lever, not shown but well known in automotive transmission, the vehicle will be in low gear and the shaft 12 will be driven directly from the gear 20 through the gear 14, the gear 16 and gear 24 to the shaft 12. When the gear 24 is shifted to the right it meshes with the intermediate gear 18 so that the shaft 12 is rotated in the reverse direction to reverse the machine. The ring 36 during both of these movements will necessarily be in the neutral position as shown in Figure 1. When the ring 36 is moved to the right of the position shown in Figure 1 the inner cone surface on the cup 39 first engages with the cone surface on the ring 28 to synchronize movement of the gear 25 and the ring 36. As the ring 36 moves into position three of the pins 40 may first engage the sides of the lugs 29 on the gear 25. As soon as the gear 25 rotates sufficiently to allow the pins 40 to drop off the edge of the lugs these pins will furnish driving engagement between the gear 25 and the ring 36 so that the ring 36 will be driven by means of the gear 25. Since the ring 36 is keyed to the shaft 12 this latter shaft will be driven. This is the driving connection for the second speed. For high speed or direct drive the ring 36 is shifted to the left. The cone surface of the ring 34 contacting with the outer cone surface on the end of the shaft 11 synchronizes the speed of the shaft 11 with that of the ring 36. When the ring 36 is brought into contact with the end of the shaft 11 the pins 31 are first forced down against the tension of the springs 32. As soon as these pins slip off the sides of the lugs 35 they form positive driving connection to the sides of these lugs to give a positive direct drive between the shaft 11 and the ring 36 which is keyed to the shaft 12 to drive it. The alternate set of pins 31 are in position to take up back-lash in case the ring 36 should tend to rotate faster than the driving shaft 11.

It will be obvious to those skilled in the art that various changes may be made in my device without departing from the spirit of the invention, and therefore I do not limit myself to what is shown in the drawings and described in the specification but only as indicated in the appended claims.

Having thus fully described my said invention, what I claim as new and desire to secure by Leters Patent, is:

1. In a transmission gear for motor vehicles having a driving and a driven shaft in alinement one with the other, a clutch comprising a gear having spaced lugs on one face and having a cone shaped periphery, a ring axially slidable on the driven shaft, pins axially slidable in the ring, said pins carrying on their outer ends a dish shaped member adapted to engage the cone surface on the said gear, and a plurality of short spaced pins mounted in the said ring and adapted to engage certain of the lugs on the face of the said gear, resilient means tending to urge said last-named pins outwardly, substantially as set forth.

2. In a transmission gear for motor vehicles having a driving and a driven shaft in alinement one with the other, a clutch comprising a gear having spaced lugs on one face and having a cone shaped periphery, a ring axially slidable on the driven shaft, pins axially slidable in the ring, said pins carrying on their outer ends a dish shaped member adapted to engage the cone surface on the said gear, and a plurality of short spaced pins mounted in the said ring and adapted to engage certain of the lugs on the face of the said gear, said lugs having dished sides adapted to receive the cylindrical surface of the said last named pins, substantially as set forth.

3. In a transmission gear for motor vehicles having a driving and a driven shaft in alinement one with the other, a clutch comprising a gear having spaced lugs on one face and having a cone shaped periphery, a ring axially slidable on the driven shaft, pins axially slidable in the ring, said pins carrying on their outer ends a dish shaped member adapted to engage the cone surface on the said gear, a plurality of short spaced pins axially movably mounted in the said ring and adapted to engage certain of the lugs on the face of the said gear, and means for resiliently holding the said first named pins in the position to which they are moved, substantially as set forth.

4. In a transmission gear for motor vehicles having a driving and a driven shaft in alinement one with the other, a clutch comprising a gear secured against axial movement on the driven shaft but rotatable thereon and a ring axially slidable on the driven shaft and splined thereto, the gear having a plurality of spaced lugs on the face adjacent the ring, the ring having a plurality of spring pressed pins adapted to engage with the lugs to drive the gear from the ring, the ring carrying another group of pins axially slidable therein, the last named pins carrying on their outer ends a clutch cone adapted to engage a conical surface on the periphery of the said gear to synchronize the speed of the gear with the speed of the ring preparatory to positively clutching the two together, substantially as set forth.

In witness wherof, I have hereunto set my hand at New Orleans, Louisiana, this 18th day of February, A. D. nineteen hundred and thirty.

JOHN FLETCHER GAYLORD.